US009900386B2

(12) United States Patent
Garces-Erice et al.

(10) Patent No.: US 9,900,386 B2
(45) Date of Patent: Feb. 20, 2018

(54) PROVISIONING DATA TO DISTRIBUTED COMPUTING SYSTEMS

(71) Applicant: International Business Machines Corporation, Armonk, NY (US)

(72) Inventors: Luis Garces-Erice, Rueschlikon (CH); John G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 14/682,299

(22) Filed: Apr. 9, 2015

(65) Prior Publication Data
US 2016/0301768 A1  Oct. 13, 2016

(51) Int. Cl.
G06F 15/16 (2006.01)
H04L 29/08 (2006.01)
G06F 9/50 (2006.01)

(52) U.S. Cl.
CPC ........ H04L 67/1097 (2013.01); G06F 9/5077 (2013.01)

(58) Field of Classification Search
CPC ............. H04L 67/2847; H04L 67/1097; G06F 9/5077
USPC .................................................. 709/203–250
See application file for complete search history.

(56) References Cited

U.S. PATENT DOCUMENTS 6,557,079 B1 * 4/2003 Mason, Jr. .......... G06F 12/0862
711/113
7,529,891 B2 * 5/2009 Thekkath ............ G06F 12/0862
711/129
7,725,658 B2 * 5/2010 Lang ................... G06F 12/0862
600/300

(Continued)

FOREIGN PATENT DOCUMENTS

CN  103345514 A  10/2013
WO  2004099989 A2  11/2004

(Continued)

OTHER PUBLICATIONS

Clerc et al., "OS Streaming Deployment," in Proceeding of IPCCC'10, pp. 169-179, Albuquerque, NM, USA, Dec. 2010. IEEE Computer Society.

(Continued)

Primary Examiner — Moustafa M Meky
Assistant Examiner — Thorne E Waugh
(74) Attorney, Agent, or Firm — Nicholas D. Bowman

(57) ABSTRACT

Data comprising a plurality of data blocks is provisioned to a distributed computing system, via a network, from remote data storage at a data-provider site. At a node computer of the distributed computing system, a network access client is provided for obtaining data blocks from the remote data storage via the network, and adaptation layer logic is provided for generating metadata for the data blocks in a file system of the distributed computing system. Also at the node computer, a copy-on-read driver is provided for accessing the remote data storage via the network access client and for accessing local data storage of the node computer. In response to a first read request corresponding to a data block from the node computer, the copy-on-read driver copies that data block from the remote data storage to the local data storage for use in the distributed computing system.

18 Claims, 6 Drawing Sheets

(56) References Cited

U.S. PATENT DOCUMENTS

| | | | |
|---|---|---|---|
| 8,473,567 B2* | 6/2013 | Mannava | H04L 65/607 |
| | | | 709/216 |
| 8,490,088 B2* | 7/2013 | Tang | G06F 9/4856 |
| | | | 718/1 |
| 8,495,625 B1 | 7/2013 | Sanders | |
| 8,516,159 B2 | 8/2013 | Ananthanarayanan et al. | |
| 8,650,159 B1 | 2/2014 | Zhang et al. | |
| 9,298,633 B1* | 3/2016 | Zhao | G06F 12/0862 |
| 9,304,928 B2* | 4/2016 | Udayashankar | G06F 12/0862 |
| 9,411,864 B2* | 8/2016 | Glider | G06F 17/30578 |
| 9,444,905 B2* | 9/2016 | Islam | H04L 67/2847 |
| 9,665,646 B1* | 5/2017 | Belan | H04N 19/00 |
| 2013/0074146 A1 | 3/2013 | Branson et al. | |
| 2013/0159543 A1 | 6/2013 | Yandek et al. | |
| 2014/0181039 A1 | 6/2014 | Harrison et al. | |
| 2015/0373139 A1* | 12/2015 | Kisel | H04L 67/1095 |
| | | | 709/213 |

FOREIGN PATENT DOCUMENTS

| | | |
|---|---|---|
| WO | 2010017492 A1 | 2/2010 |
| WO | 2013003713 A2 | 1/2013 |
| WO | 2014051928 A1 | 4/2014 |
| WO | 2016162797 A1 | 10/2016 |

OTHER PUBLICATIONS

Mell, P. et al., "The NIST Definition of Cloud Computing," Recommendations of the National Institute of Standards and Technology, U.S. Department of Commerce, Special Publication 800-145, 7 pgs., Sep. 2011.

Schmuck et al., "GPFS: A Shared-Disk File System for Large Computing Clusters," in Proceedings of the 1st USENIX Conference on File and Storage Technologies (FAST '02). USENIX Association, Monterey, CA, USA, Article 19, 2002, 15 pgs.

Tudoran et al., "Evaluating Streaming Strategies for Event Processing Across Infrastructure Clouds," http://www.mcs.anl.gov/papers/P5108-0314.pdf, 9 pgs.

White, T., 2012. Hadoop: The Definitive Guide (3rd ed.). O'Reilly Media, Inc., 647 pgs.

Application No. PCT/IB2016/051938, Notification of Transmittal of the International Search Report and the Written Opinion of the International Searching Authority, or the Declaration, dated Aug. 24, 2016, 14 pages.

\* cited by examiner

PROVISIONING DATA TO DISTRIBUTED COMPUTING SYSTEMS

BACKGROUND

The present invention relates generally to provisioning data to distributed computing systems, and more specifically to provisioning data to such systems via a network from remote data storage at a data-provider site.

Processing large amounts of data requires correspondingly large amounts of computation power and storage. Owners of large data sets commonly use distributed computing systems for processing the data to extract useful information. Distributed computing systems typically employ a plurality of networked node computers for parallel processing of data. Such systems provide for distributed storage of data to be processed and can support sophisticated parallel processing applications for efficient extraction of information from massive data sets. Distributed computing systems are commonly implemented in datacenters containing multiple high-performance computers which can be deployed as a scalable infrastructure to accommodate data/compute intensive parallel processing applications according to data-provider requirements. Some distributed computing systems are private systems dedicated to particular data providers. Others allow resources to be shared by different data providers. Both types of system can be offered as a rental facility in a cloud computing environment, allowing data owners to obtain information from their data sets without prohibitive investment in the necessary computing resources.

The scalability of distributed computing systems allows the processing necessary to transform data sets into useful information to be sped-up. Generally speaking, the more data that is available, the more information, and thus value, that can be extracted. The flexibility of distributed computing systems allows a data owner to scale out the infrastructure dedicated to process data sets as they grow, reducing the time required to extract valuable information. This is a desirable property, in that increasing value (size) of the data allows the owner to spend more on the infrastructure, thus keeping the time-to-value ratio constant. A remaining problem, however, is how to make the data available at the computing facility sufficiently fast that the data transfer does not negate the gains from scaling out the processing. The data set has to be transferred to the computing facility, which is typically off-site, via a network. As the amount of data grows and the processing itself becomes more scalable, this step consumes more and more of the time required to obtain the desired results from the data, thus decreasing value. Rentals for cloud computing systems, for example, are commonly available on an hourly basis, so spending more and more time transferring a data set for processing is highly undesirable, delaying availability of results and reducing value to the data owner.

SUMMARY

According to at least one embodiment of the present invention there is provided a method for provisioning data comprising a plurality of data blocks to a distributed computing system, via a network, from remote data storage at a data-provider site. The method includes providing, at a node computer of the distributed computing system, a network access client for obtaining data blocks from the remote data storage via the network. The method also includes providing, at the node computer, adaptation layer logic for generating metadata for the data blocks in a file system of the distributed computing system. The method further includes providing, at the node computer, a copy-on-read driver for accessing the remote data storage via the network access client and for accessing local data storage of the node computer. The method additionally includes, at the copy-on-read driver, in response to a first read request corresponding to a data block from the node computer, copying that data block from the remote data storage to the local data storage for use in the distributed computing system.

The embodiments described above may allow streaming provisioning of data over a network from a data-provider site to a distributed computing system. Data can be made available for processing earlier since the entire data set need not be transferred to the system before processing commences. This may inhibit loss of value due to processing delays as overall data transfer time increases with data set size. Data can be made available on-demand at the computing system, e.g., as required for processing. Useful information can thus be extracted from data sooner, e.g., as soon as the data is available, adding value to the information obtained. Moreover, the embodiments described may allow this to be achieved in a way that is transparent to the tools commonly employed in distributed computing systems.

Advantageously, embodiments may include, at the node computer, providing first read requests corresponding to data blocks to the copy-on-read driver to prefetch those data blocks for a processing application running on the distributed computing system. This prefetching of data blocks allows blocks to be copied to the node computer's local storage before they are required for processing by the application. While some blocks are being processed by the application, further blocks can be copied over in the background and be made ready for subsequent processing.

Another embodiment of the present invention provides a computer program product comprising a computer readable storage medium having program instructions embodied therein. The program instructions are executable by a node computer of a distributed computing system to cause the node computer to implement a method according to any of the foregoing embodiments.

A further embodiment of the present invention provides a distributed computing system comprising at least one node computer (and more typically a plurality of node computers). The node computer(s) include an ingress node computer for provisioning input data comprising a plurality of input data blocks to the distributed computing system, via a network, from remote data storage at a data-provider site. The ingress node computer has local data storage operatively coupled therewith, and a network access client for obtaining input data blocks from the remote data storage via the network. The ingress node computer also has adaptation layer logic for generating metadata for the input data blocks in a file system of the distributed computing system. The ingress node computer additionally has a copy-on-read driver for accessing the remote data storage via the network access client and for accessing the local data storage. The copy-on-read driver is adapted, in response to a first read request corresponding to an input data block from the node computer, to copy that input data block from the remote data storage to the local data storage for use in the distributed computing system.

Preferred embodiments of the computing system include output data storage and an egress node computer operatively coupled with the output data storage. The output data storage stores processed data, comprising a plurality of processed data blocks, generated by the distributed computing system.

The egress node computer has a network access server for supplying processed data blocks, via the network, to a network access client at the data-provider site. These embodiments allow streaming provisioning of processed data from the distributed computing system to a data-provider system. The data provider can thus obtain processing results as they become available. Results can be extracted from the computing system on-demand, without waiting for processing of an entire data set to be completed.

Another embodiment of the present invention provides a data-provider system for communicating data, via a network, with a remote distributed computing system. The data-provider system includes first data storage for storing input data and second data storage for storing processed data. The input data comprises a plurality of input data blocks to be processed by the distributed computing system. The processed data comprises a plurality of processed data blocks generated by the distributed computing system. The data-provider system includes a network access server for supplying input data blocks, via the network, to a first network access client at a node computer of the distributed computing system. The data-provider system includes a second network access client for obtaining processed data blocks, via the network, from remote data storage at the distributed computing system. The data-provider system also includes a copy-on-read driver for accessing the remote data storage via the second network access client and for accessing the second data storage. The copy-on-read driver is adapted, in response to a first read request corresponding to a processed data block from the data-provider system, to copy that processed data block from the remote data storage to the second data storage. The data-provider system thus provides for streaming provisioning of data to a distributed computing system for processing, and also streaming provisioning of the resulting processed data back to the data-provider system.

Embodiments of the invention will be described in more detail below, by way of illustrative and non-limiting example, with reference to the accompanying drawings.

DETAILED DESCRIPTION

Figure 1:
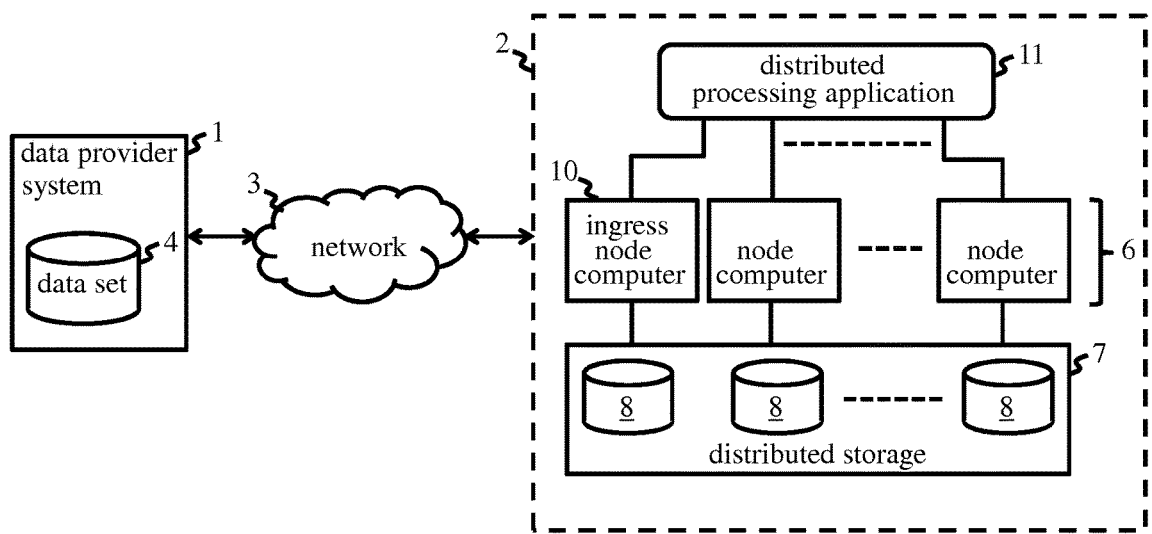
FIG. 1 is a schematic representation of a system in which embodiments of the invention may be employed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The high-level block diagram of FIG. 1 illustrates a data-provider system 1 which can communicate with a remote distributed computing system 2 via a network 3 (where network 3 may in general comprise one or more component networks and/or internetworks including the Internet) in accordance with an embodiment. Data-provider system 1 is located at a data-provider site, and includes local data storage for storing a data set to be processed by distributed computing system 2. In this embodiment the data set is stored in disk storage apparatus represented by disk 4 in the figure. The data set comprises a plurality of input data blocks stored in accordance with a local file system for managing storage and retrieval of data blocks from disk 4.

Distributed computing system 2 of this example comprises a plurality (commonly referred to as a cluster) of node computers 6. The node computers 6 are operatively coupled to a distributed storage apparatus 7 that is local to system 2. The distributed storage apparatus 7 is illustrated here as disk storage apparatus comprising a plurality of disks 8. Node computers 6 are interconnected via a high-speed network (not shown) of distributed computing system 2. The node computers control storage and retrieval of data in disks 8 in accordance with a distributed file system of computing system 2. The set of node computers includes an ingress node computer 10 for provisioning input data blocks (stored in remote storage 4 at the data-provider site) to computing system 2 via the network 3. The node computers 6 perform read/write accesses to data in disks 8 on behalf of a distributed processing application running on computing system 2. The distributed processing application, indicated schematically at 11, may run on node computers 6 and/or one or more further computers (not shown) networked with node computers 6 in system 2. The processing application 11 may in general comprise one or more component applications.

Data-provider system 1 may be implemented by one or more (general- or special-purpose) computers each comprising one or more machines (real or virtual). The system 1 may include one or more computer readable storage media containing executable program instructions for causing the computer(s) of the system to implement functionality described herein.

Data storage 4 of the data-provider system 1 may in general comprise any convenient data storage apparatus including one or more data storage media. Typical implementations comprise disk storage apparatuses comprising one or more disks, such as magnetic or optical disks, which may be internal to computer(s) of system 1, e.g., in a hard disk drive, or provided by externally-accessible disk apparatuses, e.g., in a disk drive array such as a RAID array.

Distributed storage 7 of computing system 2 may similarly comprise any convenient storage system, and may typically comprise a disk storage system. The disk storage system may include disk apparatuses dedicated to individual node computers 6, e.g., hard disks thereof, and/or external disk apparatuses such as one or more disk arrays accessible to node computers 6 via a storage network.

Distributed computing system 2 may be implemented in one or more data centers having multiple (general- or special-purpose) computers each comprising one or more (real or virtual) machines for implementing node computers 6. Distributed computing system 2 may be implemented in a cloud computing system which can be provided as a service to the data-provider in a cloud computing environment. A brief description of cloud computing is given below. It is to be understood, however, that implementation of the teachings herein is not limited to a cloud computing environment, and embodiments of the invention can be implemented in conjunction with any other type of computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include the following characteristics.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms.

Resource pooling: the provider's computing resources are pooled to serve multiple consumers using a multi-tenant model, with different physical and virtual resources dynamically assigned and reassigned according to demand.

Rapid elasticity: capabilities can be rapidly and elastically provisioned, in some cases automatically, to quickly scale out, and rapidly released to quickly scale in. To the consumer, the capabilities available for provisioning often appear to be unlimited and can be purchased in any quantity at any time.

Measured service: cloud systems may automatically control and optimize resource use by leveraging a metering capability at some level of abstraction appropriate to the type of service (e.g., storage, processing, bandwidth, and active user accounts).

A cloud model may include one or more of the following Service Models.

Software as a Service (SaaS): the capability provided to the consumer is to use the provider's applications running on a cloud infrastructure.

Platform as a Service (PaaS): the capability provided to the consumer is to deploy onto the cloud infrastructure consumer-created or acquired applications created using programming languages and tools supported by the provider.

Infrastructure as a Service (IaaS): the capability provided to the consumer is to provision processing, storage, networks, and other fundamental computing resources where the consumer is able to deploy and run arbitrary software, which can include operating systems and applications.

A cloud model may be deployed in accordance with the following Deployment Models.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

When distributed computing system 2 is implemented in a cloud computing environment, node computers 6 implement cloud computing nodes. These nodes may be grouped, physically or virtually, in one or more networks such as Private, Community, Public, or Hybrid clouds as described above, or a combination thereof. This allows the cloud computing environment to offer infrastructure, platforms and/or software as services for which a cloud consumer does not need to maintain resources on a local computing system.

Figure 2:
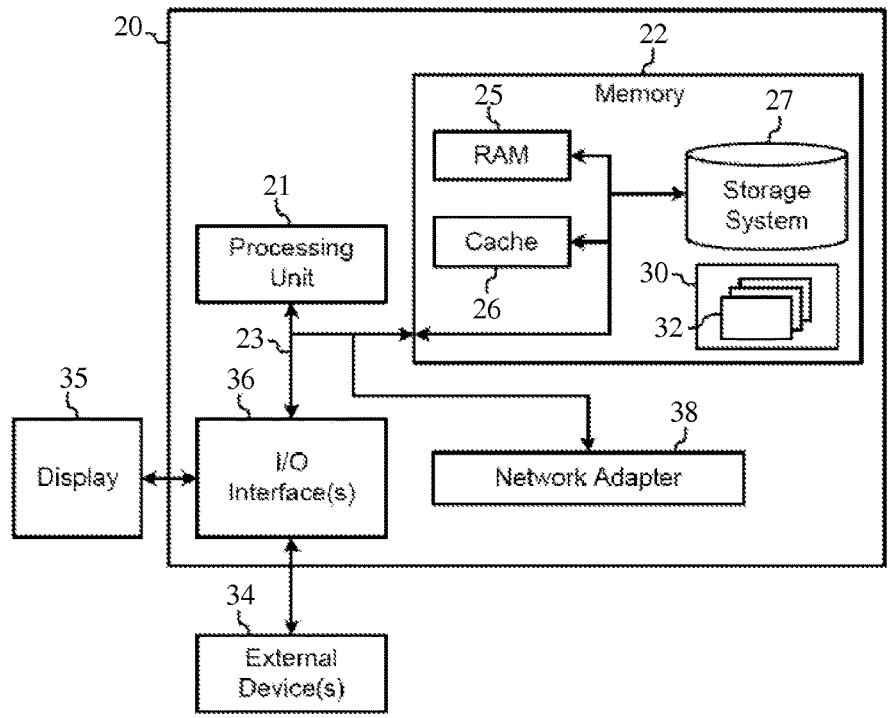
FIG. 2 is a generalized schematic of a node computer in the FIG. 1 system.

The block diagram of FIG. 2 shows an exemplary computing apparatus for implementing a node computer 6 of system 2, e.g. as a cloud computing node. The apparatus is shown here in the form of a general-purpose computing device 20. The components of computer 20 may include processing apparatus such as one or more processors represented by processing unit 21, a system memory 22, and a bus 23 that couples various system components including system memory 22 to processing unit 21.

Bus 23 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 20 typically includes a variety of computer readable media. Such media may be any available media that is accessible by computer 20 including volatile and non-volatile media, and removable and non-removable media. For example, system memory 22 can include computer readable media in the form of volatile memory, such as random access memory (RAM) 25 and/or cache memory 26. Computer 20 may further include other removable/non-removable, volatile/non-volatile computer system storage media. By way of example only, storage system 27 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 23 by one or more data media interfaces.

Memory 22 may include at least one program product having one or more program modules that are configured to carry out functions of embodiments of the invention. By way of example, program/utility 30, having a set (at least one) of program modules 32, may be stored in memory 22, as well as an operating system, one or more application programs, other program modules, and program data. Each of the operating system, one or more application programs, other program modules, and program data, or some combination thereof, may include an implementation of a networking environment. Program modules 32 generally carry out the functions and/or methodologies of embodiments of the invention as described herein.

Computer 20 may also communicate with: one or more external devices 34 such as a keyboard, a pointing device, a display 35, etc.; one or more devices that enable a user to interact with computer 20; and/or any devices (e.g., network card, modem, etc.) that enable computer 20 to communicate with one or more other computing devices. Such communication can occur via Input/Output (I/O) interfaces 36. Also, computer 20 can communicate with one or more networks such as a local area network (LAN), a general wide area network (WAN), and/or a public network (e.g., the Internet) via network adapter 38. As depicted, network adapter 38 communicates with the other components of computer 20 via bus 23. It should be understood that although not shown, other hardware and/or software components could be used in conjunction with computer 20. Examples include, but are not limited to: microcode, device drivers, redundant processing units, external disk drive arrays, RAID systems, tape drives, and data archival storage systems, etc.

Figure 3:
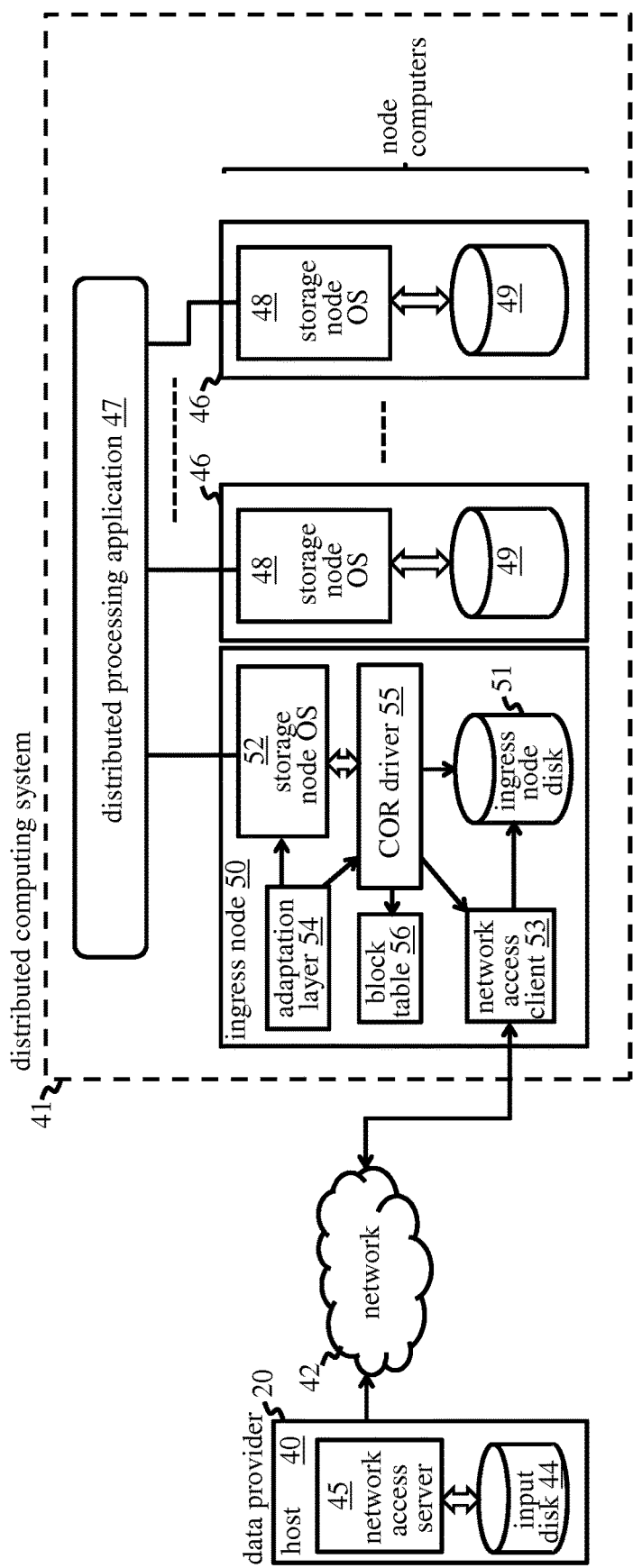
FIG. 3 is a schematic block diagram of a first system embodying the invention.

FIG. 3 is a more detailed schematic illustrating implementation of system 1 in a first embodiment of the invention. In this embodiment, data provider system 20 comprises a first host computer 40 which can connect to a distributed computing system 41 of a cloud provider via a network 42. Network 42 comprises the Internet in this example. The host computer 40, which may be implemented generally as computer 20 of FIG. 2, is operatively coupled to first local storage containing the input data set to be processed. The first local storage is represented in the figure as input disk 44. Host computer 40 provides a network access server, represented by module 45, comprising logic for supplying input data blocks from input disk 44 to computing system 41 as described herein.

The distributed computing system 41 of this embodiment comprises a cluster of node computers 46. In this example, each node computer 46 implements a storage node of a distributed file system used by a distributed processing application 47. Processing application 47 may comprise one or more arbitrary applications for processing data sets. To develop such applications, standard methodologies such as the MPI (Message Passing Interface), Spark and MapReduce systems, and algorithm sets such as the Hadoop framework, have emerged to facilitate their scalability in a distributed environment. These tools may be completely unconcerned as to how the data is made available to them. They use abstractions merely concerned with files for their processes. These tools may use files as intermediate output during the processing of the data. Files used as output for some tasks are used as input for others, allowing for flexible distribution of the processing over the infrastructure of computing system 41. While any convenient file system may be implemented in computing system 41 depending on the particular processing application(s) and tools utilized, particular examples include GPFS (General Parallel File System) and HDFS (Hadoop Distributed File System). GPFS is described, for example, in "GPFS: A Shared-Disk File System for Large Computing Clusters", Schmuck and Haskin, In Proceedings of the 1st USENIX Conference on File and Storage Technologies (FAST '02), Article 19, 2002. HDFS is described, for example, in "Hadoop: The Definitive Guide (3rd ed.)", Tom White, O'Reilly Media, Inc., 2012.

Each node computer 46 provides a storage node operating system (OS) 48 for controlling access to data stored in a plurality of disks 49 in accordance with the distributed file system. A single disk 49 is shown in each storage node for simplicity here. Other arrangements are possible as described herein. For instance, each disk 49 in the figure may represent a plurality of shared disks accessible via a switching fabric by one or more storage nodes.

The cluster of node computers in computing system 41 includes an ingress node computer indicated generally at 50. The ingress node computer 50 is operatively coupled to a local data storage of system, represented by ingress node disk 51 in the figure. The ingress disk 51 corresponds to a disk 49 of the distributed storage system and the comments herein on implementation of disks 49 may apply also to ingress node disk 51. Ingress node 50 provides a storage node OS 52, together with logic implementing: a network access client represented by module 53; an adaptation layer represented by module 54; and a copy-on-read (COR) driver represented by module 55.

The network access client 53 is operable to obtain input data blocks from remote input disk 44 of data-provider system 20 via the network 42. The file system used for input of data blocks from disk 44 is known to OS 52 of the ingress node. The network access client 53 can request input data blocks via network 42 from network access server 45 of host system 40. The server 45 accesses input disk 44 and supplies the required blocks to network access client 53 via the network 42. Various server and client logic 45, 53 can be used here for exporting content of input disk 44 to ingress node 50. For example, client logic 53 may be implemented as an iSCSI (Internet Small Computer System Interface) initiator. Server logic 45 may comprise an iSCSI server and input disk 44 an iSCSI target. Alternatively, for example, client logic 53 may comprise a NBD (Network Block Device) client and server 45 a NBD server.

The COR driver 55 offers a disk interface to OS 52 of ingress node 50. The COR driver 55 is operable to access the remote input disk 44, via network access client 53, and also the local ingress node disk 51. The COR driver thus provides an abstraction over two storage entities, here disks 44 and 51, each of which is accessed as a sequence of blocks. This abstraction allows ingress node OS 52 (or an application running thereon) to access any of the blocks in the remote disk 44 by copying them on first access to local disk 51. A second access to the same block is satisfied by COR driver 55 from local disk 51 directly. The two disks 44 and 51 can thus be seen as a single logical disk (referred to herein as the "ingress disk") accessible via COR driver 55. Any blocks supplied to COR driver 55 for writing to this logical disk are stored on the local disk 51. As indicated schematically in FIG. 3, the COR driver 55 maintains a block table 56 indicating which blocks are available locally on disk 51, and which still need to be copied from remote disk 44. This block table may be stored on local disk 51 or other storage of the ingress node. The COR driver 55 can be implemented in any convenient manner to provide the functionally described, and suitable implementations will be apparent to those skilled in the art from the description herein. One example of a COR driver which may be employed here is described in "OS Streaming Deployment", Clerc et al., In Proceeding of IPCCC'10, pp. 169-179, IEEE Computer Society, December 2010.

The adaptation layer logic 54 is operable to generate metadata for input data blocks in the file system of computing system 41. This involves adding metadata (e.g., headers) to the files on the ingress disk, and communicating with one or more other nodes in system 41 to create the appropriate metadata in the directory structure of the file system. This makes the presence of the files known in the distributed file system and thus makes the files available for use by processing application 47.

Details of the metadata generation process performed by adaptation layer 54 will depend on the particular file system employed in cluster 41. Suitable implementations for adaptation layer 54 will be readily apparent to those skilled in the art for a given file system. By way of example, in the case of GPFS, the ingress disk can be included as a shared disk on a filesystem node implemented by ingress node 50. The ingress node 50 can be dedicated to manage this disk, thus providing the metadata manager for files on the disk. Generation of metadata for files on the ingress disk may involve updating the allocation map used in GPFS systems to include the blocks used on the ingress disk so that the files can be transferred in the system. The inodes for those blocks will be created, and the corresponding directory block will be updated so that the files appear in the file system. This operation is facilitated by making the ingress node the metadata manager for the files as indicated herein. As another example, in the case of HDFS, adaptation layer 54 can create the metadata for each block stored on the ingress disk by computing the CRC checksums of the data and adding the version and type. An HDFS client in adaptation layer 54 may create the HDFS files by contacting the node 46 implementing the namenode for the HDFS system and inserting a new entry.

Figure 4:
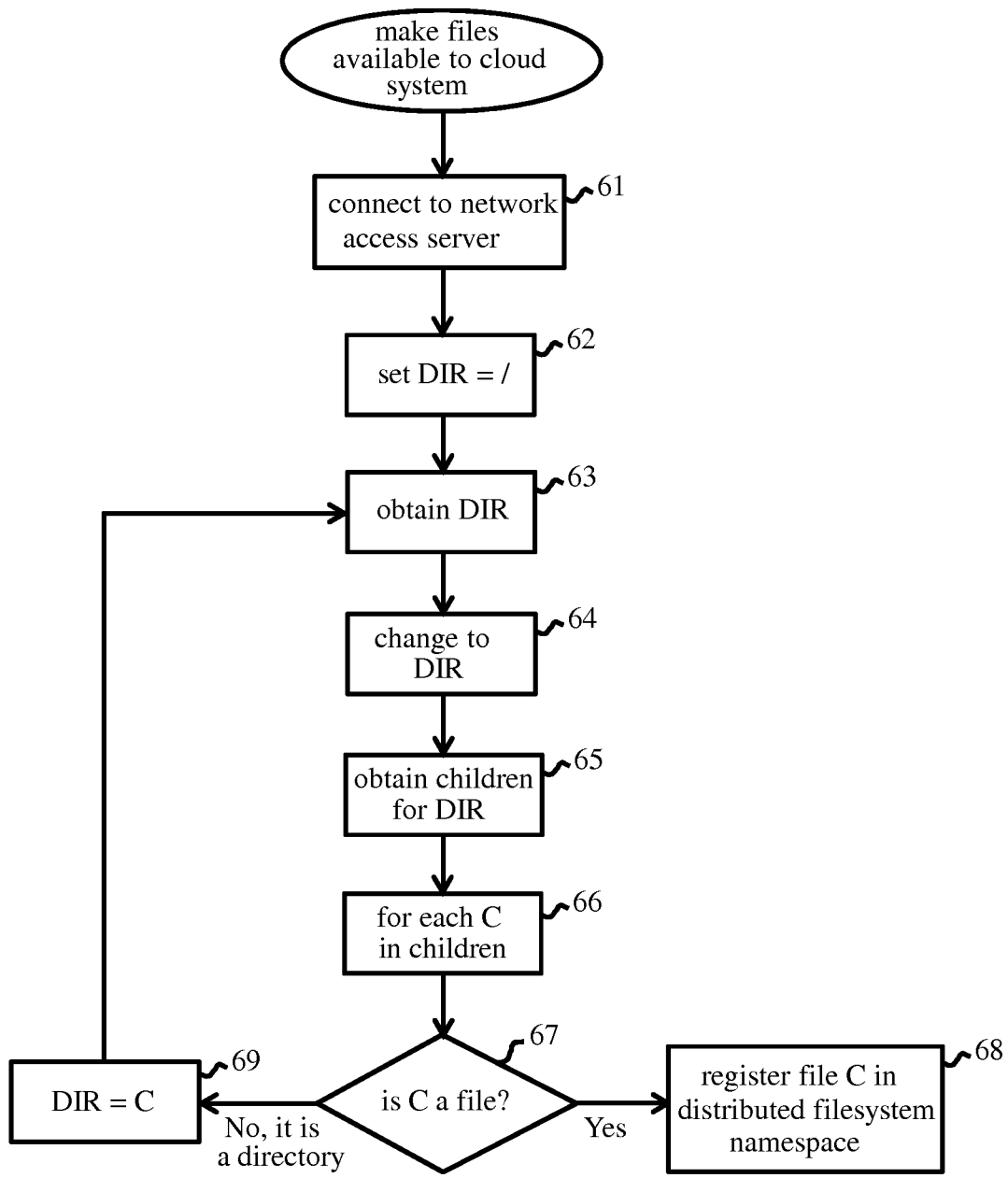
FIG. 4 indicates steps performed by exemplary adaptation layer logic of the FIG. 3 system.

Different steps of the metadata generation process may be performed at different stages in operation of the FIG. 3 system as appropriate. In a simple implementation, however, adaptation layer 54 may generate the metadata for the entire data set in input disk 44 as a preliminary operation. FIG. 4 indicates steps in one example of operation of the adaptation layer 54 in such a case. To make files containing blocks on input disk 44 available to cloud system 41, in step 61 the adaptation layer 54 connects to network access server 45 of host 40 to access the local file system of disk 44. This connection can be made over network 42 via the COR driver 55 and network access client 53 of ingress node 50. In step 62, the adaptation layer sets a current directory DIR to the root directory of the local file system, e.g., DIR=/. In step 63, the adaptation layer obtains the root directory listing, and in step 64 the current directory DIR is set to the root directory name. In step 65, the adaptation layer obtains the listing of child folders (children) of the current (initially root) directory DIR. For each child folder C of these children, as represented by step 66, the adaptation layer performs the following steps. In decision step 67, the adaptation layer determines if the current child C is a file. If so, then operation proceeds to step 68 where the adaptation layer registers the file C in the distributed filesystem namespace of cloud system 41. In this step, the adaptation layer generates the necessary filesystem metadata as described herein. The adaptation layer may add required metadata to the file and may call the distributed file system as described above to create the metadata necessary to make the data available to application 47. Metadata may be added to files by writing to input disk 44 in this step, or such metadata may be added later when files are copied to ingress node disk 51 as described herein. Returning to decision step 67, if the current child C is not a file then it is itself a directory. In this case operation proceeds to step 69 where the current directory DIR is set to the current child directory C. The process then reverts to step 63 for child directory C, and the subsequent operation proceeds as before to identify children of this child directory. In this way, adaptation layer 54 progresses through the directory structure of input disk 44 until all child folders have been identified. Following this operation, all input data blocks in disk 44 are available to be accessed by distributed processing application 47, and can be copied over from input disk 44 when required.

Figure 5:
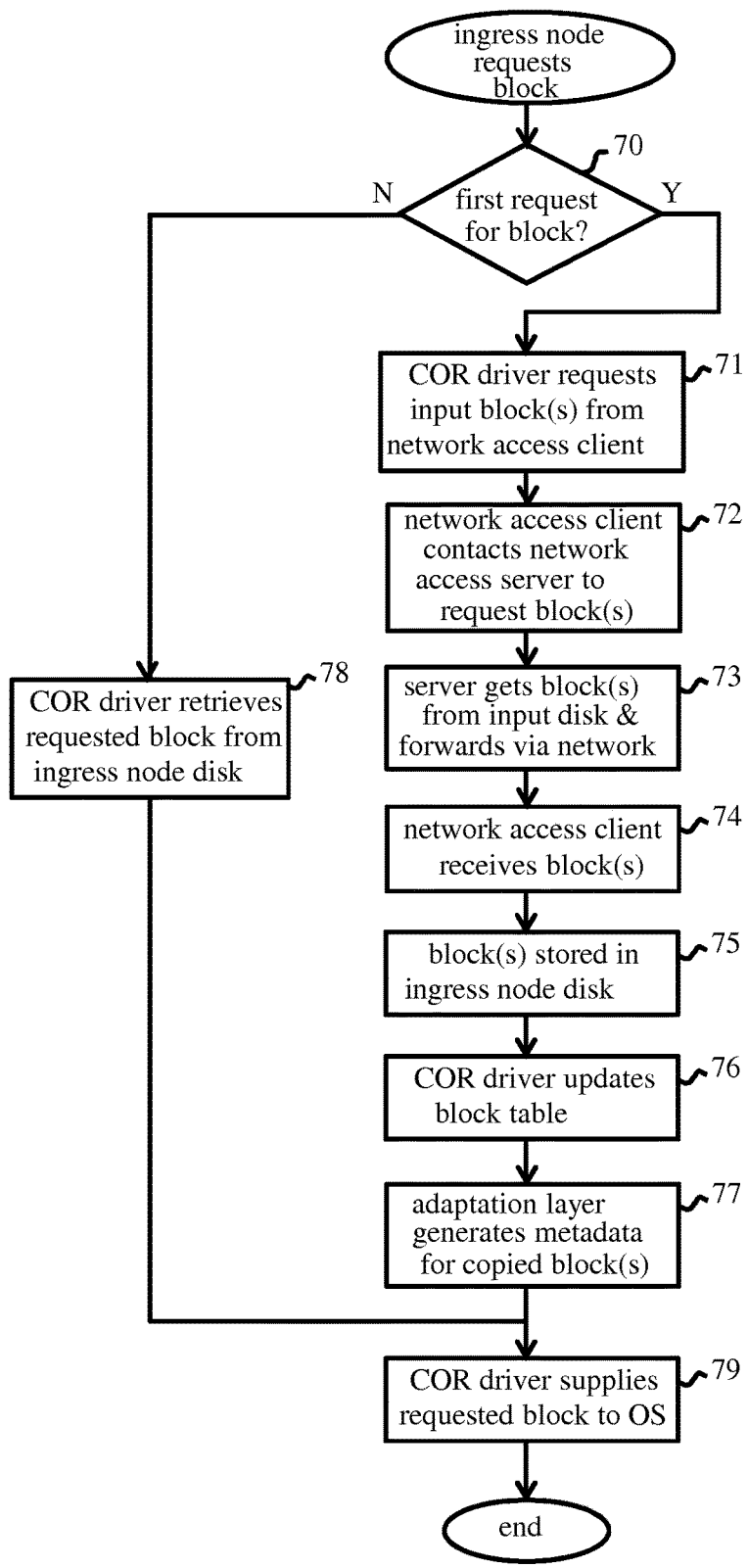
FIG. 5 indicates steps performed in operation of the FIG. 3 system.

Basic steps in operation of the FIG. 3 system are indicated in the flow chart of FIG. 5. The operation commences when ingress node OS 52 requests access to a block on the ingress disk. This block request may originate at ingress node 50 or may be relayed from another node 46 in system 41. This block request may correspond to a request for one or more input data blocks as stored on input disk 44. In a typical scenario, blocks used by the distributed file system of computing system 41 may be large files corresponding to a plurality of data blocks of input disk 44. In decision step 70, COR driver 55 checks whether this request is the first request for the data block. This is decided by checking block table 56 to determine if the requested block is already available in local disk 51. If not, then the request is a first request for the data block. In this case, operation proceeds to step 71 and COR driver 55 requests the network access client 53 to obtain the required input data block(s) from remote disk 44 at the data provider site. In step 72, the network access client 53 contacts the network access server 45 of host system 40, via network 42, to request the required block(s). In step 73, the server 45 retrieves the block(s) from input disk 44 and forwards the block(s) to network access client 53 over network 42. The network access client 53 receives the block(s) in step 74 for storage in local disk 51 in step 75. In step 76, COR driver 55 updates the block table 56 to indicate that the requested block is available in local disk 51. In step 77 of this example, adaptation layer 54 can generate any further metadata required for the copied block(s), e.g. adding metadata to the data copied to local disk 51 if required.

Returning to decision step 70, if it is determined from the block table that the request is not the first request for the data block, then operation proceeds to step 78. In this step, COR driver 55 accesses the data block in local disk 51. The data block is supplied to OS 52 in step 79 as required, and the operation is then complete. The COR driver 55 is thus adapted, in response to a first read request corresponding to an input data block from the ingress node, to copy that block from remote disk 44 to local disk 51 whereby the data is then available for use in computing system 41. In response to any subsequent request corresponding to the same block, the data can be accessed directly in local disk 51.

It will be seen that operation of the COR driver 55 and adaptation layer 54 may enable streaming provisioning of data to system 41 from input disk 44. The distributed processing application 47 can begin processing of the data set without first waiting for the entire data set to be copied from input disk 44, avoiding costly delays. The minimum amount of data needed to start processing can be transferred, with the rest following as required, e.g., on demand by the processing. Although the files used by a typical processing application 47 are usually of large size, e.g., gigabytes or terabytes, data can be transferred at a smaller granularity while still being usable by the application. Start-up times can thus be improved, reducing the time required to obtain value from data sets. Intermediate processing results can also be made available sooner. This allows early detection of problems, for example with algorithms used to process the data. Even if preliminary tests have been run on a sample of the data, an entire data set usually shows properties that are missed when test-processing a small sample. Only data that is actually required by the processing need be transferred with the above system, so not all data in input disk 44 may be transferred. Operation of the COR driver may also ensure that no data is transferred more than once. Moreover, the streaming provisioning operation may be completely transparent to the tools commonly used in the processing cluster 41, in that the tools themselves do not need modification to work.

Figure 6:
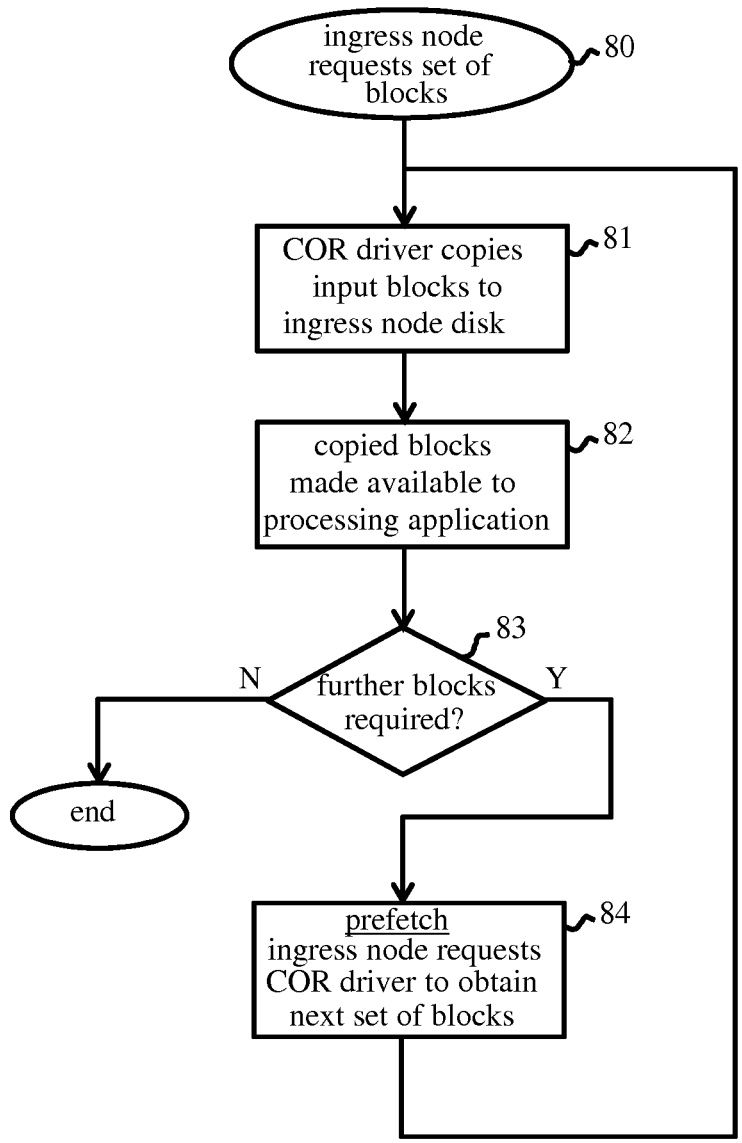
FIG. 6 indicates steps performed in another operation of the FIG. 3 system, wherein prefetching is used.

Once data has been copied to local disk 51 by COR driver 55, it may be replicated or otherwise distributed inside the storage network of system 41 in accordance with inherent mechanisms of the distributed file system. In preferred embodiments, system 41 also performs prefetching of data for processing application 47. Operation of such an embodiment is indicated in the flow chart of FIG. 6. In step 80 of this figure, ingress node OS 52 requests an initial set of data blocks from COR driver 55. In step 81, the COR driver 55 copies the required set of input blocks from remote disk 44 to local disk 51 as described herein. In step 82, the copied blocks are made available to application 47, with appropriate metadata being generated, by adaptation layer 54 if not done previously as described herein. In decision block 83 it is decided if further input data blocks are required for processing. For example, the test here may be to determine if there are still uncopied blocks in input disk 44, or if processing application 47 has requested further blocks in advance of processing. If so, in response to a request from ingress node OS 52 in step 84 to prefetch a further set of data blocks, operation reverts to step 81 where COR driver 55 prefetches the required input data blocks from input disk 44. The prefetched blocks are then stored in disk 51 and made available for processing in step 82 as necessary. The prefetch operation thus continues until it is decided in step 83 that no further blocks are required.

With the above operation, read requests corresponding to input data blocks are provided to COR driver 55 to prefetch those data blocks for processing application 47. The prefetching operation described may be implemented, for example, by functionality of OS 52 or by inherent prefetching functionality of processing application 47. This prefetching of blocks from remote disk 44 allows batches of data blocks to be copied to system 41 while previous batches are being processed. Data can thus be copied in the background, so that the data is available inside the high-speed network 41 by the time the application 47 needs it. As an example of the benefit brought by this approach, on a computation that lasts for as long as it takes the data to be transferred, time could be almost cut in half. This offers significant savings in a cloud environment as the computing resources may need not be rented for as long.

Figure 7:
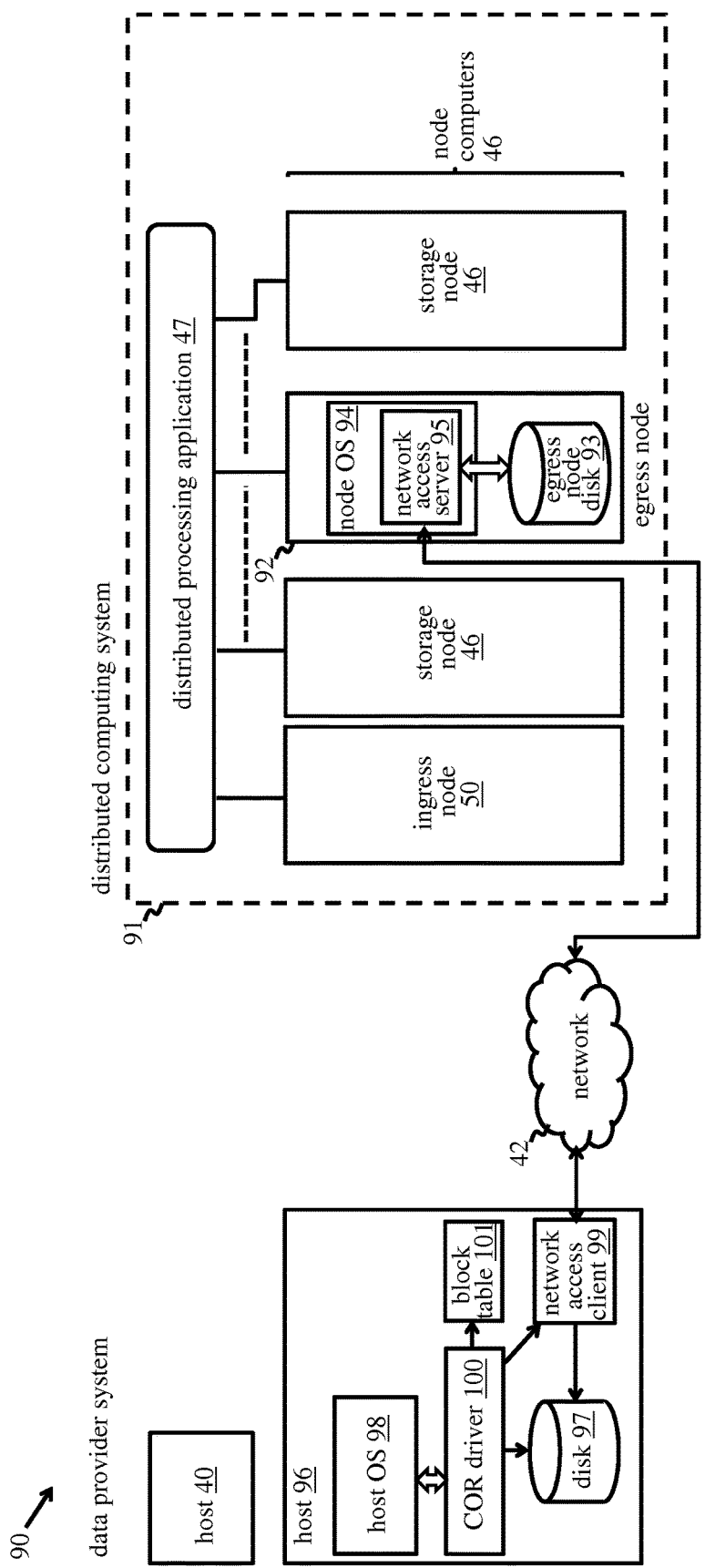
FIG. 7 is a schematic block diagram of another system embodying the invention.

FIG. 7 illustrates a modification to the FIG. 3 system in a preferred embodiment. The system 90 of FIG. 7 includes all components of the FIG. 3 system. Like components are indicated by corresponding reference numerals and need not be described further. In system 90, however, the node computers of computing system 91 include an egress node computer 92 which is operatively coupled with output data storage provided by an egress node disk 93. The egress node disk 93 stores processed data, comprising a plurality of processed data blocks, generated by computing system 91 and containing the results of processing the input data set. The egress node disk uses a file system known to a host computer, described below, at the data provider site. The egress node computer includes a storage node OS 94 and a network access server 95 for supplying processed data blocks, via network 42, to the data provider system.

The data provider system of this embodiment includes a second host computer 96 operatively coupled with local data storage, here disk storage apparatus represented by disk 97 in the figure. Host computer 96 includes a host OS 98 and a network access client 99 for obtaining processed data blocks, via network 42, from egress node disk 93. The file system of disk 93 is therefore known to host OS 98. Host 96 also includes a copy-on-read driver 100 operable to access remote egress node disk 93, via network access client 99, and also local disk 97. The COR driver 100 thus presents a disk interface to host OS 98 and provides an abstraction over the two disks 93 and 97. The two disks 93 and 97 can thus be seen as a single logical disk (referred to herein as the "egress disk") accessible via COR driver 100.

The various components of egress node 92 and host 96 in this embodiment operate in similar manner to the corresponding elements already described for the FIG. 3 system, and can be implemented in like manner. Hence, COR driver 100 is operable, in response to a first read request for a processed data block from host OS 98, to copy that block from remote disk 93 to local disk 97. The network access client 99 thus requests processed data blocks via network 42 from network access server 95, and server 95 accesses disk 93 and supplies the required blocks to network access client 99 via the network. A second access to a previously-copied block is satisfied by COR driver 100 from local disk 97 directly. The COR driver 100 maintains a block table 101 indicating which blocks are available locally on disk 97, and which are only available on remote disk 93. Any blocks supplied to COR driver 100 for writing to the egress disk are stored on local disk 97.

The FIG. 7 system provides both streaming provisioning of data sets into system 91, and streaming provisioning of processing results back to the data provider site. A data consumer may thus be able to access results data on-demand as soon as this data becomes available. All data produced during the processing can remain inside system 91, and only the results data specifically required need be extracted by the consumer. This is especially advantageous with cloud systems 91 in which the consumer is billed for taking data out of the cloud. The results of processing a data set may not be of interest in their entirety, but may still be as large as the input data set, depending on the application. With the FIG. 7 system, the consumer may need to pay exclusively for the output data required.

The time gained through early availability of results data in the above embodiments is illustrated by the following analysis. This assumes that the network is the bottleneck, which is likely the case when using a WAN (Wide Area Network) to access a remote datacenter. Assume: T=time to transfer a block of data; and P=time to process a block of data. Then, assuming N blocks and N processes (where streaming is the least beneficial because the processing cannot benefit from transfer of data in the background):

1. The time required to obtain any result when transferring the file first is NT+P (given that all blocks are processed in parallel);

2. The time required to obtain result i when using streaming is iT+P;

3. (iT+P) is smaller (NT+P) for any intermediate result other than the last one. Thus streaming provides benefit even when blocks cannot be transferred in the background because all processing can be done simultaneously. This is not, however, the most common scenario, as data is usually much larger than the processing capacity of the system.

Various alternatives and modifications to the above embodiments can of course be envisaged. For example, while the distributed computing systems 41, 91 of the above embodiments include a plurality of node computers, embodiments can be envisaged in which the functionality of node computers 46 is implemented by a single node computer. Hence, the distributed computing system could comprise a single node computer in some embodiments. Embodiments may also be envisaged in which the computing system contains more than one ingress and/or egress node for provisioning data from and/or to a data provider system. The data provider system of FIG. 7 may be implemented in general by one or more host computers. Functionality may also be provided for encrypting the data transmitted over network 42, and decrypting the data on receipt.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for provisioning data comprising a plurality of data blocks to a distributed computing system, via a network, from remote data storage at a data-provider site, the method comprising, at a node computer of the distributed computing system:
   providing a network access client for obtaining said plurality of data blocks from said remote data storage via the network;
   providing adaptation layer logic for generating metadata for said plurality of data blocks in a file system of the distributed computing system;
   providing a copy-on-read driver for accessing the remote data storage via the network access client and for accessing local data storage of the node computer; and
   at the copy-on-read driver, in response to a first read request from the node computer corresponding to a data block of said plurality of data blocks from the node computer, copying that data block from the remote data storage to said local data storage for use in the distributed computing system;
   wherein the method further comprises:
      providing output data storage for storing processed data, comprising a plurality of processed data blocks, generated by the distributed computing system; and
      providing an egress node computer operatively coupled with said output data storage, the egress node computer having a network access server for supplying processed data blocks, via the network, to a network access client at the data-provider site.

2. The method of claim 1, further comprising, at the node computer, providing first read requests corresponding to other data blocks of the plurality of data blocks to the copy-on-read driver to prefetch those other data blocks for a processing application running on the distributed computing system.

3. The method of claim 1, further comprising, at the adaptation layer logic, generating metadata for the data block prior to copying of the data block by the copy-on-read driver.

4. The method of claim 1, wherein said network comprises the Internet.

5. The method of claim 1, wherein the distributed computing system comprises a cloud computing system.

6. A distributed computing system comprising at least one node computer including an ingress node computer for provisioning input data comprising a plurality of input data blocks to the distributed computing system, via a network, from remote data storage at a data-provider site, the ingress node computer having:
   local data storage operatively coupled therewith;
   a network access client for obtaining said plurality of input data blocks from said remote data storage via the network;
   adaptation layer logic for generating metadata for said plurality of input data blocks in a file system of the distributed computing system; and
   a copy-on-read driver for accessing the remote data storage via the network access client and for accessing said local data storage, the copy-on-read driver being adapted, in response to a first read request corresponding to an input data block of the plurality of input data blocks from the node computer, to copy that input data block from the remote data storage to said local data storage for use in the distributed computing system;
   wherein the distributed computing system further comprises:
      output data storage for storing processed data, comprising a plurality of processed data blocks, generated by the distributed computing system; and
      an egress node computer operatively coupled with said output data storage, the egress node computer having a network access server for supplying processed data blocks, via the network, to a network access client at the data-provider site.

7. The distributed computing system of claim 6, further comprising a plurality of node computers.

8. The distributed computing system of claim 6, wherein the system is adapted to provide first read requests corresponding to respective input data blocks of the plurality of input data blocks to the copy-on-read driver to prefetch those input data blocks for a processing application running on the distributed computing system.

9. The distributed computing system of claim 6, wherein the adaptation layer logic is adapted to generate metadata for the input data block prior to copying of the input data block by the copy-on-read driver.

10. The distributed computing system of claim 6, wherein said local data storage comprises at least one disk.

11. The distributed computing system of claim 6, wherein said output data storage comprises at least one disk.

12. The distributed computing system of claim 6, wherein said network comprises the Internet.

13. The distributed computing system of claim 6, wherein said distributed computing system comprises a cloud computing system.

14. A data-provider system for communicating data, via a network, with a remote distributed computing system, the data-provider system comprising:
   first data storage for storing input data, comprising a plurality of input data blocks, to be processed by the distributed computing system;
   second data storage for storing processed data, comprising a plurality of processed data blocks, generated by the distributed computing system;
   a network access server for supplying input data blocks of the plurality of input data blocks, via the network, to a first network access client at an ingress node computer of the distributed computing system;
   a second network access client for obtaining processed data blocks of the plurality of processed data blocks, via the network, from remote data storage at the distributed computing system, the distributed computing system having an egress node computer operatively coupled to said remote data storage, the egress node computer having a second network access server for supplying the processed data blocks, via the network, to the second network access client; and
   a copy-on-read driver for accessing said remote data storage via the second network access client and for accessing said second data storage, the copy-on-read driver being adapted, in response to a first read request corresponding to a processed data block of said plurality of processed data blocks from the data-provider system, to copy that processed data block from the remote data storage to the second data storage.

15. The data-provider system of claim 14, further comprising:
   a first host computer operatively coupled with said first data storage, the first host computer providing said network access server; and a second host computer operatively coupled with said second data storage, the second host computer providing said second network access client and said copy-on-read driver.

16. The data-provider system of claim 15, wherein each of said first and second data storage comprises at least one disk.

17. The data-provider system of claim 14, wherein said network comprises the Internet.

18. A computer program product for provisioning data comprising a plurality of data blocks to a distributed computing system, via a network, from remote data storage at a data-provider site, said computer program product comprising a computer readable storage medium having embodied therein:

first program instructions executable by a node computer of the distributed computing system to cause a network access client of the node computer to obtain said plurality of data blocks from said remote data storage via the network;

second program instructions executable by the node computer to cause the node computer to generate metadata for said plurality of data blocks in a file system of the distributed computing system;

third program instructions executable by the node computer to cause the node computer to access the remote data storage via the network access client and to access local data storage of the node computer, and, in response to a first read request corresponding to a data block of said plurality of data blocks from the node computer, to copy that data block from the remote data storage to said local data storage for use in the distributed computing system; and fourth program instructions executable by an egress node computer of the distributed computing system operatively coupled with output data storage for storing data, comprising a plurality of processed data blocks, generated by the distributed computing system, to cause the egress node computer to supply processed data blocks, via the network, to a network access client at the data-provider site.

* * * * *